US 8,838,602 B1

(12) United States Patent
Zhang et al.

(10) Patent No.: US 8,838,602 B1
(45) Date of Patent: Sep. 16, 2014

(54) SYSTEMS AND METHODS FOR WEB PAGE GROUPING BASED ON URLS

(75) Inventors: Fenghui Zhang, Redmond, WA (US); Peng Li, Bellevue, WA (US); Lin Liao, Bothell, WA (US); Zhiting Xu, Redmond, WA (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 13/271,188

(22) Filed: Oct. 11, 2011

(51) Int. Cl.
*G06F 17/30* (2006.01)
*G06F 11/34* (2006.01)

(52) U.S. Cl.
CPC .................. *G06F 11/3495* (2013.01)
USPC ........................................................ 707/737

(58) Field of Classification Search
None
See application file for complete search history.

(56) References Cited

U.S. PATENT DOCUMENTS

| | | | |
|---|---|---|---|
| 5,751,956 A * | 5/1998 | Kirsch ........................... | 709/203 |
| 5,870,559 A | 2/1999 | Leshem et al. | |
| 6,275,862 B1 | 8/2001 | Sharma et al. | |
| 6,308,210 B1 | 10/2001 | Fields et al. | |
| 6,549,944 B1 * | 4/2003 | Weinberg et al. ............. | 709/224 |
| 6,647,381 B1 * | 11/2003 | Li et al. ................................. | 1/1 |
| 6,781,599 B2 | 8/2004 | Abello et al. | |
| 6,981,037 B1 * | 12/2005 | Srikant et al. ................. | 709/223 |
| 7,035,926 B1 | 4/2006 | Cohen et al. | |
| 7,043,702 B2 | 5/2006 | Chi et al. | |
| 7,103,838 B1 * | 9/2006 | Krishnamurthy et al. .... | 715/202 |
| 7,165,105 B2 | 1/2007 | Reiner et al. | |
| 7,305,622 B2 | 12/2007 | Cohen et al. | |
| 7,596,716 B2 | 9/2009 | Frost et al. | |
| 7,644,375 B1 * | 1/2010 | Anderson et al. ............. | 715/853 |
| 7,676,465 B2 | 3/2010 | Poola | |
| 7,707,229 B2 | 4/2010 | Tiyyagura | |
| 7,792,843 B2 | 9/2010 | Iverson | |
| 7,792,844 B2 | 9/2010 | Error et al. | |
| 7,917,382 B2 | 3/2011 | Cereghini et al. | |
| 7,958,189 B2 | 6/2011 | Bernstein | |
| 8,010,657 B2 | 8/2011 | Hall et al. | |
| 8,065,300 B2 * | 11/2011 | Gupta et al. ................... | 707/730 |
| 8,332,371 B1 * | 12/2012 | Brin ............................... | 707/696 |

(Continued)

FOREIGN PATENT DOCUMENTS

| | | |
|---|---|---|
| KR | 10-2003-0088636 | 11/2003 |
| WO | WO-01/57706 A2 | 8/2001 |
| WO | WO-2004/003701 | 1/2004 |

OTHER PUBLICATIONS

Li et al., Entropy-Based Criterion in Categorical Clustering, Proceedings of the 21st International Conference on Machine Learning, Banff, Canada, 2004, 8 pages.*

(Continued)

*Primary Examiner* — Jacob F Bétit
*Assistant Examiner* — Tyler Torgrimson
(74) *Attorney, Agent, or Firm* — Foley and Lardner LLP; John D. Lanza (57) ABSTRACT

Systems and methods for webpage grouping based on URLS include receiving a uniform resource locator item; receiving a plurality of flow paths from a database, each flow path representing a path of web page visits by a user, each flow path comprising the uniform resource locator item, each flow path further comprising at least one other uniform resource locator item having a uniform resource locator prefix; defining a node for display based on the uniform resource locator prefix common to the plurality of flow paths; and generating display data comprising a representation of the uniform resource locator item and a representation of the defined node.

19 Claims, 3 Drawing Sheets

(56) References Cited

U.S. PATENT DOCUMENTS

| | | | |
|---|---|---|---|
| 2001/0020238 A1* | 9/2001 | Tsuda | 707/5 |
| 2003/0023715 A1 | 1/2003 | Reiner et al. | |
| 2003/0115333 A1 | 6/2003 | Cohen et al. | |
| 2003/0131097 A1 | 7/2003 | Kasriel et al. | |
| 2004/0059746 A1* | 3/2004 | Error et al. | 707/102 |
| 2004/0174397 A1 | 9/2004 | Cereghini et al. | |
| 2004/0196311 A1 | 10/2004 | Cadez et al. | |
| 2004/0267961 A1* | 12/2004 | Dietz et al. | 709/245 |
| 2005/0203902 A1* | 9/2005 | Davis et al. | 707/6 |
| 2006/0149728 A1 | 7/2006 | Error et al. | |
| 2006/0242145 A1* | 10/2006 | Krishnamurthy et al. | 707/6 |
| 2006/0277212 A1 | 12/2006 | Error | |
| 2007/0280113 A1 | 12/2007 | Ninan et al. | |
| 2008/0181463 A1 | 7/2008 | Error | |
| 2008/0201357 A1 | 8/2008 | Error et al. | |
| 2009/0070366 A1* | 3/2009 | Zhao et al. | 707/102 |
| 2009/0083421 A1 | 3/2009 | Glommen et al. | |
| 2010/0228731 A1* | 9/2010 | Gollapudi | 707/737 |
| 2010/0251128 A1 | 9/2010 | Cordasco | |
| 2010/0257024 A1* | 10/2010 | Holmes et al. | 705/10 |
| 2011/0055710 A1 | 3/2011 | Kirkby et al. | |
| 2011/0167063 A1 | 7/2011 | Tengli et al. | |
| 2012/0047180 A1* | 2/2012 | Kirshenbaum | 707/797 |
| 2012/0158496 A1* | 6/2012 | Solomon et al. | 705/14.49 |
| 2012/0290920 A1 | 11/2012 | Crossley | |
| 2013/0091270 A1* | 4/2013 | Zhang et al. | 709/224 |

OTHER PUBLICATIONS

Li et al., Entropy-Based Criterion in Categorical Clustering, Proceedings of the 21$^{st}$ International Conference on Machine Learning, Banff, Canada, 2004, 8 pages.

Mathieu et al., Local Structure in the Web, WWW2003 Poster Template, http://www2003.org/cdrom/papers/poster/p102/p102-mathieu.htm, 4 pages.

Howard, Jennifer, "Citation by Citation, New Maps Chart Hot Research and Scholarship's Hidden Terrain", The Chronicle, Sep. 11, 2011, 8 pages.

D. Edler & M. Rosvall (2010), Load and Simplify Network, Alluvial Generator, printed on Nov. 8, 2011, retrieved from internet URL: www.mapequation.org/alluvialgenerator/index.html, 6 pages.

Mapping Science, Eigenfactor.org, printed on Nov. 9, 2011, retrieved from internet URL: http://www.eigenfactor.org/map, 1 page.

Overview, Eigenfactor.org, printed on Nov. 9, 2011, retrieved from internet URL: http://www.eigenfactor.org/methods.php, 1 page.

Psychological Bulletin (1997), Eigenfactor.org, retrieved from internet URL: http://well-formed.eigenfactor.org/img/shots/change_02.png, 1 page.

Rosvall et al., Mapping Change in Large Networks. PLoS ONE, Jan. 27, 2010, 13 pages.

US Notice of Allowance on U.S. Appl. No. 13/271,191 Dtd Feb. 18, 2014, 8 pages.

Coremetrics—IBM WebSphere Portal Analytics, Best Practices Overview, Aug. 2009, 20 pages.

Cunningham et al, TrafficFlow: Visualizing User Sessions, Stanford University, URL: https://graphics.stanford.edu/wikis/cs448b-09-fall/FPIPP-CunninghamBen-MacDougallDaniel?action=AttachFile&do=get&target=trafficflow.pdf, 2009, 8 pages.

Data Visualization, Stanford University, URL https://graphics.stanford.edu/wikis/cs448b-09-fall/FPIPP-CunninghamBen-MacDougallDaniel; retrieved from internet on Sep. 22, 2011; 11 pages.

IBM Coremetrics Web Analytics User Guide, Jun. 15, 2011, 122 pages.

Metronome Labs, Products::Metronome Explain, Mar. 27, 2010, 2 pages.

Title Lockdown Media, Source http://netscale.cse.nd.edu/, URL: http://netscale.cse.nd.edu/twiki/bin/, view/Main/LockdownMedia, retrieved from Internet on Sep. 22, 2011, 12 pages.

Title: Unica Netinsight, Source Unica.com, URL http://www.unica.com/documents/us/, Unica_ProSheet_NetInsight_1209.pdf, Date 2009.

US Notice of Allowance on U.S. Appl. No. 13/271,214 Dtd Sep. 16, 2013.

US Office Action on U.S. Appl. No. 13/271,191 Dtd Jun. 19, 2013.
US Office Action on U.S. Appl. No. 13/271,222 Dtd Jul. 16, 2013.
US Office Action on U.S. Appl. No. 13/271,214 Dtd Dec. 20, 2012.
US Office Action on U.S. Appl. No. 13/271,214 Dtd Jun. 3, 2013.

Paul, Visual Sciences: Path Analysis using Path Browser, Source http://webanalyticssimplified.blogspot.com/, URL http://webanalyticssimplified.blogspot.com/2009/12/visual010sciencespath010analysis010using.html, Date: Dec. 28, 2009.

US Notice of Allowance on U.S. Appl. No. 13/271,214 Dtd Nov. 4, 2013.

US Notice of Allowance on U.S. Appl. No. 13/271,191 Dtd Nov. 25, 2013.

US Office Action on U.S. Appl. No. 13/271,222 Dtd Dec. 31, 2013, 30 pages.

* cited by examiner

SYSTEMS AND METHODS FOR WEB PAGE GROUPING BASED ON URLS

BACKGROUND

The Internet provides access to a wide variety of content. For instance, images, audio, video, and web pages for many different topics are accessible through the Internet. The accessible content provides an opportunity to present advertisements to users. Advertisements can be placed within content, such as a web page, image or video, or the content can trigger the display of one or more advertisements, such as presenting an advertisement in an advertisement slot within the content and/or in an advertisement slot of a pop-up window or other overlay.

The flow of Internet traffic is an important metric for website owners, advertisers, and other interested parties. For example, traffic data may include information as to how a user arrives at a website (e.g., by starting their web browsing at the website, by following a hyperlink from another website, etc.), how a user navigates within the website (e.g., by traversing from a product information page to a shopping cart page and later to a purchase page), and where users go after visiting the website (e.g., by clicking on advertisements, by navigating to other websites, etc.). Interested parties can use traffic information to make changes to the website, tailor an advertising campaign a certain way, and perform other functions.

The amount of traffic information available regarding even a basic Internet transaction can be cumbersome for interested parties. Users may visit numerous, different uniform resource locators (URLs), to complete substantially the same types of transactions. For example, an advertiser may wish to know more about the number of users that actually add a product to an online shopping cart. However, a unique URL may be generated each time a user adds a product to a shopping cart. In addition, various parties may be interested in how users arrive at certain webpages. For example, one user may perform an Internet search for a specific product, while another user may follow an advertisement link, to arrive at the same product description page. Therefore, the number of traffic paths that users may follow may also be large. For these and other reasons, generating visualizations of the flow of Internet traffic is challenging and difficult.

SUMMARY

Implementations of the systems and methods for web page grouping based on universal resource locators (URLs) are described herein. One implementation is a system including one or more computers configured to perform operations to generate display data for a plurality of flow paths representing web page visits by a plurality of users including receiving a uniform resource locator item. The system may also include receiving a plurality of flow paths from a database, each flow path representing a path of web page visits by a user, each flow path comprising the uniform resource locator item, each flow path further comprising at least one other uniform resource locator item having a uniform resource locator prefix. The system may also include determining the uniform resource locator prefix based on a portion of the uniform resource locator item common to the plurality of flow paths representing web page visits. The system may further include defining a node for display based on the uniform resource locator prefix common to the plurality of flow paths. The system may include generating display data comprising a representation of the uniform resource locator item and a representation of the defined node Another implementation is a computer program product tangibly stored on a non-transitory storage medium, operable to cause one or more processors to perform operations to generate display data for a plurality of flow paths representing web page visits by a plurality of users that includes receiving a uniform resource locator item. The product may also include receiving a plurality of flow paths from a database, each flow path representing a path of web page visits by a user, each flow path comprising the uniform resource locator item, each flow path further comprising at least one other uniform resource locator item having a uniform resource locator prefix. The product may also include determining the uniform resource locator prefix based on a portion of the uniform resource locator item common to the plurality of flow paths representing web page visits. The product may further include defining a node for display based on the uniform resource locator prefix common to the plurality of flow paths. The product may include generating display data comprising a representation of the uniform resource locator item and a representation of the defined node.

A further implementation is a method of generating display data for a plurality of flow paths representing web page visits by a plurality of users that includes receiving a uniform resource locator item. The method may also include receiving a plurality of flow paths from a database, each flow path representing a path of web page visits by a user, each flow path comprising the uniform resource locator item, each flow path further comprising at least one other uniform resource locator item having a uniform resource locator prefix. The method may also include determining the uniform resource locator prefix based on a portion of the uniform resource locator item common to the plurality of flow paths representing web page visits. The method may further include defining the node for display based on a uniform resource locator prefix common to the plurality of flow paths. The method may also include generating display data comprising a representation of the uniform resource locator item and a representation of the defined node.

These implementations are mentioned not to limit or define the scope of the disclosure, but to provide an example of an implementation of the disclosure to aid in understanding thereof. Particular implementations can be developed to realize one or more of the following advantages.

The details of one or more implementations of the disclosure are set forth in the accompanying drawings and the description below. Other features, aspects, and advantages of the disclosure will become apparent from the description, the drawings, and the claims.

DETAILED DESCRIPTION

Content providers (e.g., advertisers) may access various reports that disclose various user interactions with the content. Each user interaction can include a number of dimensions, which can contain data associated with the user interaction. Reports can be generated to provide an advertiser with information regarding the user interactions. Such reports can have a large number of unique user interactions. Rules can be generated that group various user interactions that match various group rules. Reports can be generated which include the various grouped user interactions. The user interactions may include conversion path data that comprises the source/medium that a user used to access the advertisers content.

According to some implementations, a more readable display may be generated to enhance understanding of flow paths and to identify flow paths that generate less revenue or few conversions. According to some implementations, the generated display data may be associated with a flow path related to visitor traffic and traffic sources. In some implementations, the generated display data may be associated with a flow path having a user-defined node related to conversions. According to other implementations, the generated display data may be associated with a flow path related to content.

Figure 1:
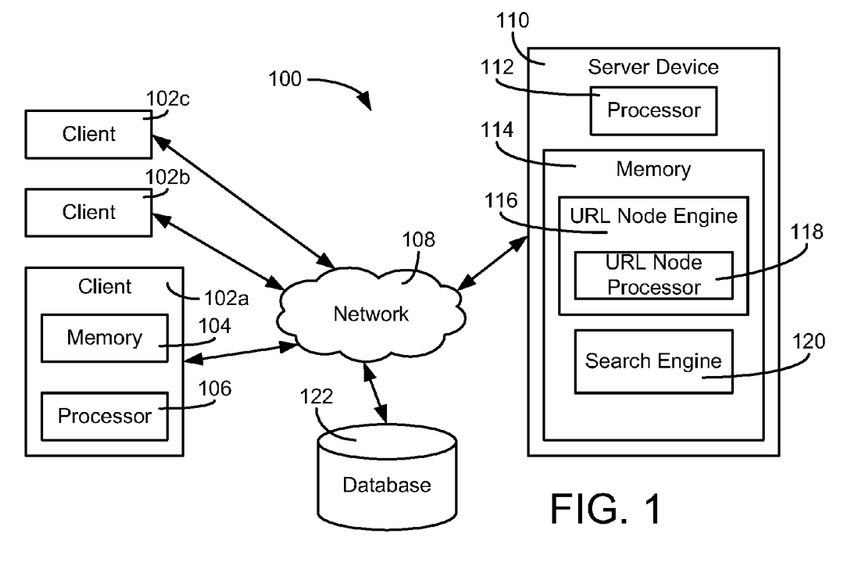
FIG. 1 is a block diagram of a system in accordance with a described implementation.

Referring to FIG. 1, a block diagram of a system in accordance with a described implementation is shown. The system 100 shown in FIG. 1 includes multiple clients 102a-102c in communication with the server 110 over a network 108. In some implementations, there are multiple servers that perform the functions of the single server in FIG. 1. The network shown includes the Internet. In other implementations, other networks, such as a WAN, LAN, or intranet may be used. In some implementations, the system and methods may operate within a single server. In a brief overview, the clients 102a-c and the server 110 may be remote from each other. The relationship of client 102a-c and server 110 arise by virtue of programs running on the respective device and having a client-server relationship to each other. In some implementations, the server 110 provides data (e.g., an HTML page) to the clients 102a-c (e.g., for purposes of displaying data to and receiving user input from a user interacting with the client). Data generated at the clients 102a-c (e.g., a result of the user interaction) can be received from the client 102a-c at the server 110.

The clients 102a-102c each comprise a processor 106 and a memory 104. The processor 106 executes program instructions stored in memory 104. The processors 106 may include a microprocessor, ASIC, FPGA, state machines, etc. The memory 104 may include, but is not limited to, electronic, optical, magnetic, or any other storage or transmission device capable of providing a processor with program instructions. The memory 104 may further include a floppy disk, CD-ROM, DVD, magnetic disk, memory chip, ASIC, FPGA, ROM, RAM, EEPROM, EPROM, flash memory, optical media, or any other suitable memory from which a processor can read instructions. The instructions may include code from any suitable computer-programming language, such as, but not limited to, C, C++, C#, Go, Java, JavaScript, Perl, Python and Visual Basic.

Clients 102a-102c may also have a number of external or internal devices such as a mouse, a CD-ROM, DVD, a keyboard, a display, or other input or output devices. Examples of clients 102a-102c are personal computers, digital assistants, personal digital assistants, cellular phones, mobile phones, smart phones, pagers, digital tablets, laptop computers, Internet appliances, and other processor-based devices. In general, a client 102a-102c may be any type of processor-based platform that is connected to a network 108 and that interacts with one or more applications. Clients 102a-102c may operate on any operating system capable of supporting a browser or browser-enabled application, such as Linux, Mac OS, Windows etc. The clients 102a-102c shown include, for example, personal computers executing a browser application program such as Apple Computer, Inc.'s Safari, Microsoft Corporation's Internet Explorer, Mozilla's Firefox, Netscape Communication Corporation's Netscape Navigator, and Opera Software's Opera.

As shown in FIG. 1, server 110 is also coupled to the network 108. The server 110 may include a processor 112 and memory 114 executing a search engine 120 application program and a URL node engine 116 application program. Similar to the clients 102a-c, the server 110 shown in FIG. 1 comprises a processor 112 having a memory. The server 110 may be implemented as a network of computer processors. In some implementations, the server 110 may be multiple servers, mainframe computers, networked computers, a processor-based device, and similar types of systems and devices.

The server 110 may include a search engine system ("search engine"). In some implementations, the search engine may include multiple systems, including, but not limited to, a crawler to retrieve data, a processor, an index engine, and an interface to receive data from the index engine to format and provide the data to a client. In some implementations, the server 110 can include a related information server, advertising server, etc. The server 110 can access the network 108 to receive a query requesting a universal resource locator (URL) item relating to the query from other devices or systems connected to the network 108. For example, the server 110 may receive a search query associated with a domain identification in the URL item that matches to a domain that is accessible via the network 108 (e.g., the internet) by a user. In response, a web page is returned for the URL item when a domain matches the search query.

Memory 114 contains the search engine 120. The search engine 120 can locate relevant information from the network 108 in response to a search query from a user. The query may include a plurality of keywords. The query may also include one or more images and keywords that are based on the image. The search engine 120 may also maintain a search log of the search queries. The search engine 120 may provide a search result set to a user via the network 108.

In some implementations, the server 110 may communicate with the network 108 to access a database 122. The database 122 may include aggregates, visits, web hits, etc. The aggregates may be a word, a proper name, a geographic name, an abbreviation, an acronym, a stock market ticker symbol, or other aggregates. In some implementations, the database 122 may be searched by a user via a user interface to locate specific documents and their location on the world wide web, e.g., universal resource locator (URL) item. In some implementations, the database 122 includes a plurality of flow paths. The flow paths may represent a path of web page visits, hits, aggregates, conversions, content, etc. The flow paths may include a universal resource locator item.

Memory 114 also contains a URL node engine 116 application program ("URL node engine"). In some implementations, the URL node engine 116 may contain a URL node processor 118. The URL node processor 118 may include logic to define a node. The URL node processor 118 may define a node based on a universal resource locator prefix common to the plurality of flow paths. In other implementations, the processor 112 may include software or hardware configured to define a node. The URL node processor 118 may be configured to identify a universal resource locator prefix in the universal resource locator. The URL node processor 118 may be configured to generate display data that may include a representation of the uniform resource locator item and a representation of the defined node.

Figure 2:
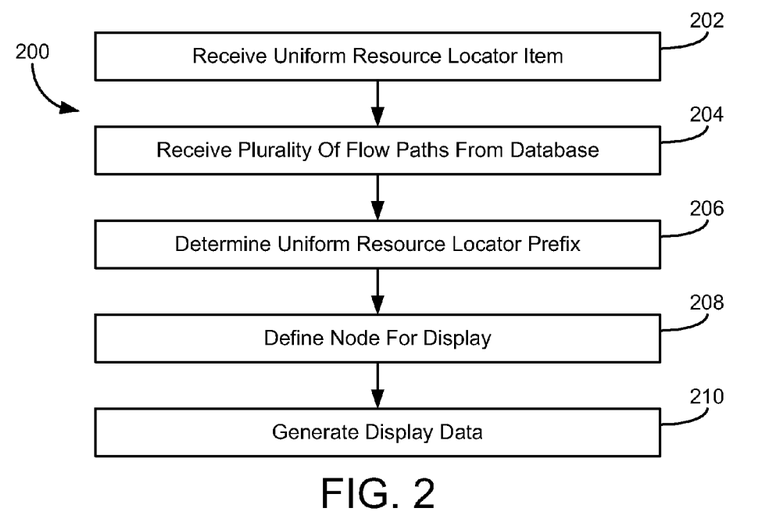
FIG. 2 is a flow diagram of a method in accordance with a described implementation.

Referring to FIG. 2, a flow diagram of a method of generating display data for a plurality of flow paths representing web page visits by a plurality of users is shown in accordance with a described implementation. The method 200 is provided by way of example, as there are a number of ways to carry out the methods according to the present disclosure. The method 200 shown in FIG. 2 may be executed or otherwise performed by one of a combination of various systems. The method may be implemented by a computer, a computer program product, a computer program, a client, a server, a client-server relationship, etc. The method 200 is described herein as carried out by the system 100 of FIG. 1, by way of example.

The example method begins at block 202, in which a uniform resource locator (URL) item is received. The uniform resource locator item may be received or accessed by server 110 connected to the network 108. In some implementations, the URL item may include a protocol name and a host name. In some implementations, the URL item may include a search query.

Block 202 is followed by block 204, in which a plurality of flow paths is received from a database, each flow path representing a path of web page visits by a user, each flow path including the uniform resource locator item, each flow path further including at least one uniform resource locator item having a uniform resource locator prefix. In some implementations, the uniform resource locator prefix includes a file name.

Block 204 is followed by block 206, in which the uniform resource locator prefix is determined. The uniform resource locator prefix may be based on a portion of the uniform resource locator item common to the plurality of flow paths representing web page visits. In some implementations, the URL prefix /shop.axd/ may include the following web page visits:

/shop.axd/home
/shop.axd/search
/shop.axd/contact

In another example, the URL prefix: /company1.com/ may include the following webpage visits:

/company1.com/footwear
/company1.com/footwear/mens

Block 206 is followed by block 208, in which a node for display based on a uniform resource locator item having a uniform resource locator prefix common to the plurality of flow paths is defined. In some implementations, the node defined includes a universal resource locator including common gateway interface parameters. In some implementations, the node is further defined by eliminating common gateway interface parameters that are not related to the URL item or the URL prefix. In some implementations, the CGI parameters and/or paths may be used to develop a tree structure. For example, for the URL:

/country/usa/prodsearch?query=laptop&brand=orange;
the tree structure would look like:

```
        Country
           usa
             Prodsearch
                query=laptop&brand=orange
```

In some implementations, CGI paths and/or parameters may be used to separate webpages with different titles, i.e., title-based nodes.

In some implementations, the node may be automatically defined. There are many possibilities to automatically define a node. In some implementations, a traffic-based approach as shown above may be used. In some implementations, a traffic-based approach may be used to automatically define the nodes. A list of URL items may be received from any website. In some implementations, the date range of the traffic may be used to sort the URL items. In some implementations, the geographic region, operating system, browser, etc. may be used to compile the list of URL items. For example, the following URL list may be compiled:

```
/abcsearch/q=cell%20phone
/abcsearch/q=mobile%20phone
/productcategory/electronics/tv?model=ABC123
/productcategory/electronics/tv?model=ABC123#showDetails
/productcategory/electronics/tv?model=ABC123#price
/checkout
/confirmation/us/thankyou.html
```

The URL list may be further defined using delimiters. For example, the URL item may be defined by, but not limited to, '/', '?', '#', '=', 'about' '$', '~', '_', '-' etc. In some implementations, other delimiters are used, e.g., special characters, unit changes, etc. In some implementations, the appropriate delimiters may be determined and/or customized for website (s). In some implementations, after the delimiter(s) are selected for URL list, the occurrences of each URL item may be calculated.

```
/abcsearch/q=cell%20phone, 1222
/abcsearch/q=mobile%20phone, 342
/productcategory/electronics/tv?model=ABC123, 170
/productcategory/electronics/tv?model=ABC123#showDetails, 173
/productcategory/electronics/tv?model=ABC123#price, 117
/checkout, 5
/confirmation/us/thankyou.html, 1
```

For example, the URL item:
/productcategory/electronics/
   tv?model=ABC123#showDetails occurred 173 times.

In some implementations, a URL tree may be constructed based on URL list.

```
/
  /abcsearch/
      /q=cell%20phone
      /q=mobile%20phone
  /productcategory/
      /electronics/
  /productcategory/
      /electronics/
          /tv?
              /model=ABC123
```

In the example, the root node is '/' and each root to node flow path is a URL item prefix from URL list. The weight of each node is the number of occurrences of the URL item prefix from website traffic.

In some implementations, a traffic-based approach is used. For example, URL list of prefixes may be generated. In some implementations, a delimiter may be used to determine the list. The occurrences of the URL item prefixes are then calculated.

```
/, 495830
/abcsearch/, 32412
/abcsearch/q=cell%20phone, 1222
```

```
/abcsearch/q=mobile%20phone, 342
/productcategory/, 9170
/productcategory/electronics/, 7023
/productcategory/electronics/tv?, 1732
/productcategory/electronics/tv?model=ABC123, 170
/productcategory/electronics/tv?model=ABC123#showDetails, 173
/productcategory/electronics/tv?model=ABC123#price, 117
/checkout, 5
/confirmation/us/thankyou.html, 1
```

Then, the number of URL item prefixes are determined to define the node. In some implementations, the appropriate number of URL item prefixes may be determined and/or customized for website(s). Once the number of URL item prefixes are determined, the URL item prefixes are sorted by the number of segments that each URL item prefix contains, i.e., the occurrences of delimiters the URL item prefix contains, and the number of occurrences. In some implementations:

```
/productcategory/electronics/tv?model=ABC123, 170
/productcategory/electronics/tv?, 1732
/abcsearch/q=cell%20phone, 1222
/productcategory/electronics/, 7023
/abcsearch/q=mobile%20phone, 342
/productcategory/, 9170
/abcsearch/, 32412
/, 495830
```

In both approaches, a node is created for the list of URL items. Each node may be a prefix of the list of URLs. In some implementations, each URL item is mapped to the node in which it belongs. In some implementations, the node(s) generated may be mutually exclusive.

In some implementations, the automatically defined node may be determined from the URL item used to access the webpage. For example, the URL item may include features such as host name, static path, script name, etc. that may be used to access the webpage. In some implementations, the node is defined by a user. The user may determine that 'showDetails' in the above URL item example is important enough to warrant its own node. In some implementations, the user may choose a dimension on URL items, such as source, medium, country, region, city, language, campaign, keyword, custom variable, browser, operating system, etc, as shown in FIG. 3.

Block 208 is followed by block 210, in which display data is generated including a representation of the uniform resource locator item and a representation of the defined node. In some implementations, the generated display data includes the representation of the URL item and the representation of the defined node based on entropy criterion. For example, if the tree-based approach is used, the entropy of each node may be calculated. An entropy threshold may be determined, and the entropy of each node may be compared to the threshold. In some implementations, the user may set the entropy threshold. If the entropy of the node is greater than the entropy threshold, then the node is merged into another node. The entropy of each node is assessed until nodes within the tree have an entropy less than the entropy threshold. In other implementations, the entropy threshold may be a function of the features of the number of URL items associated with a particular website, the number of URLs in the node, etc. In some implementations, other techniques based on node similarity/dissimilarity may be used. In some implementations, title patterns may be used to define nodes, similarity scores between titles, relationships between words, similarity scores between words, etc.

Figure 3:
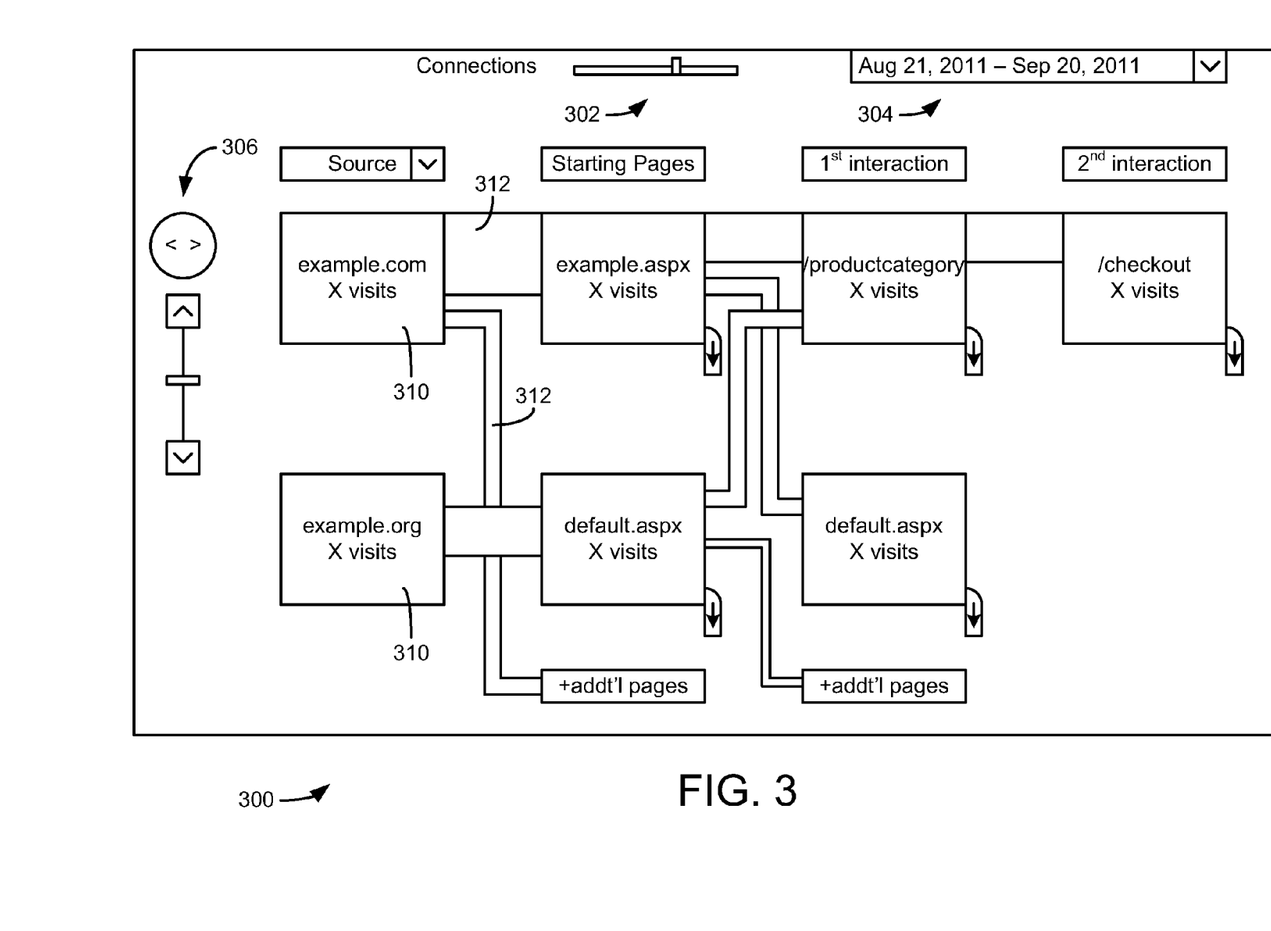
FIG. 3 illustrates display data associated with a flow path related to visitor traffic and traffic sources in accordance with a described implementation.

Referring to FIG. 3, display data associated with a flow path related to visitor traffic and traffic sources is shown in accordance with a described implementation. FIG. 3 provides display data showing a user how a visitor travels throughout their website via webpages (e.g., webpage 300). A user may view (click, highlight, touch, etc.) a node 310 to show traffic in and out of the node, details of the node (e.g., incoming, outgoing, the URL items that define the node, etc.), etc. In some implementations, the user may view (click, highlight, touch, etc.) the number of URL items and/or webpages that define the node 310, the number of visits, the number of exits/dropoff, etc. In some implementations, the user may view the flow paths 312, which may include the traffic through nodes 310. In some implementations, the user may view sources of URL items by visitors (e.g., city, language, region, etc.), sources (campaign, keyword, source, medium, etc.), or systems (browser, operating system, screen resolution, internet provider, etc.). In some implementations, the user may determine the date and/or time range 304 for the nodes. In some implementations, the user may add further interactions or delete further interactions via interface 302 or 306. For example, the user may only want to view the source and the $4^{th}$ interaction. In some implementations, the user may view more or fewer flow paths 312. In some implementations, the user may view any node 310 where there is a match to a selected keyword. The user may also choose to show display data for traffic/flow paths 312 to the node or from the node as shown in FIG. 4.

Figure 4:
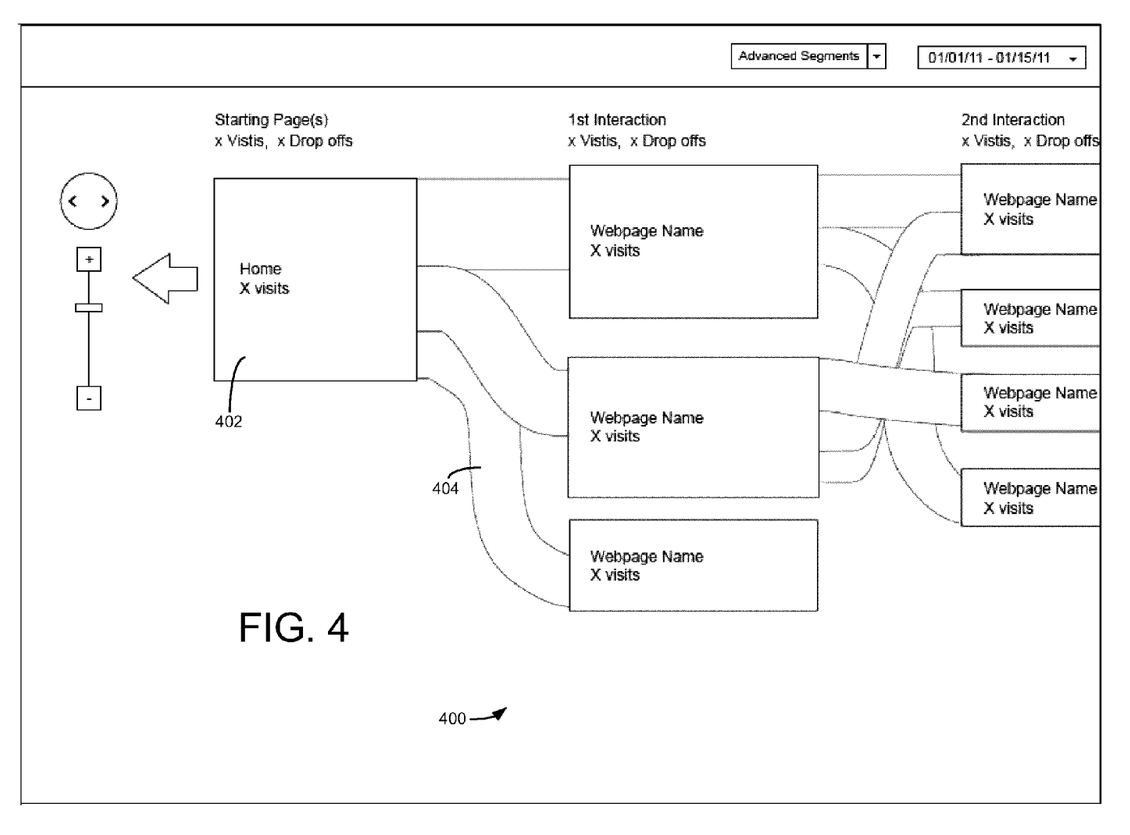
FIG. 4 illustrates display data associated with a flow path related to content in accordance with a described implementation.

Referring to FIG. 4, display data associated with a flow path related to content is shown in accordance with a described implementation. In some implementations, the display data of FIG. 4 may also allow the user to define the beginning and ending node(s), i.e., what the node(s) may include. In some implementations, the user may define the node(s) via a user interface 400. For example, the user may create a starting node 402 by entering a URL item. In some implementations, the user may filter the URL item by name (begins with, ends with, equals), regular expression (regexp), etc. In some implementations, the URL item may auto-complete using recent, preferred, etc URL items. The user may select a flow path direction 404, i.e., outbound or inbound traffic from the node(s). Once the node(s) are created, the user may hover over node(s), add node(s), eliminate node(s), hover over flow path(s), add row(s)/column(s), etc. The user may search for keywords that define the URL items and add them to the corresponding node(s). For example, the user may want the ending node to include URL items that include the word "shop." In some implementations, the user may rename and/or save the flow path(s) and/or node(s). The flow paths 404 and/or node(s) 402 may be saved in a location to be easily retrieved by a user.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "client or "server" includes all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode),TFT (thin-film transistor), or other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of generating display data for a plurality of flow paths representing web page visits by a plurality of users, comprising:
   receiving a first uniform resource locator item;
   receiving a plurality of flow paths from a database, each flow path representing a path of web page visits by a user, a flow path of the plurality of flow paths comprising the first uniform resource locator item and a second uniform resource locator item;
   determining a first uniform resource locator prefix of the first uniform resource locator item and the second uniform resource locator item of the flow path of the plurality of flow paths based on a first portion of the first uniform resource locator item matching a first portion of the second uniform resource locator item of the flow path;
   determining a second uniform resource locator prefix of the first uniform resource locator item, wherein the second uniform resource locator prefix is separated from the first uniform resource locator prefix by a delimiter, wherein the second uniform resource locator item does not include the second uniform resource locator prefix;
   determining a third uniform resource locator prefix of the second uniform resource locator item, wherein the third uniform resource locator prefix is separated from the first uniform resource locator prefix by a delimiter, wherein the first uniform resource locator item does not include the third uniform resource locator prefix;
   determining a first number of occurrences of the first uniform resource locator prefix in the plurality of flow paths;
   determining a second number of occurrences of the second uniform resource locator prefix in the plurality of flow paths;
   determining a third number of occurrences of the third uniform resource locator prefix in the plurality of flow paths;
   defining a first node representative of the determined first uniform resource locator prefix for display based on the determined first uniform resource locator prefix, wherein the first uniform resource locator item and the second uniform resource locator item of the flow path are associated with the defined first node;
   defining a second node representative of the determined second uniform resource locator prefix for display based on the determined second uniform resource locator prefix, wherein the first uniform resource locator item and the defined first node are associated with the defined second node;
   defining a third node representative of the determined third uniform resource locator prefix for display based on the determined third uniform resource locator prefix, wherein the second uniform resource locator item and the defined first node are associated with the defined third node; and
   generating display data comprising a representation of the defined first node, a representation of the defined second node, a representation of the defined third node, and a path connecting the defined first node and the defined second node indicative of a number of occurrences common to the defined first node and the defined second node based, at least in part, on the determined first number of occurrences and the determined second number of occurrences.

2. The method of claim 1, wherein the defined second node further comprises a third universal resource locator item including common gateway interface parameters.

3. The method of claim 1, wherein the defined first node is automatically defined.

4. The method of claim 1, wherein the defined first node is defined by a user.

5. The method of claim 1, wherein generating display data comprising the representation of the representation of the defined first node is based on entropy criterion.

6. The method of claim 1, wherein generating display data comprising the representation of the defined second node includes merging a fourth node with the defined second node based on an entropy of the fourth node exceeding a threshold.

7. A system comprising one or more computers configured to perform operations to generate display data for a plurality of flow paths representing web page visits by a plurality of users, comprising:
   receiving a first uniform resource locator item;
   receiving a plurality of flow paths from a database, each flow path representing a path of web page visits by a user, a flow path of the plurality of flow paths comprising the first uniform resource locator item and a second uniform resource locator item;
   determining a first uniform resource locator prefix of the first uniform resource locator item and the second uniform resource locator item of the flow path of the plurality of flow paths based on a first portion of the first uniform resource locator item matching a first portion of the second uniform resource locator item of the flow path;
   determining a second uniform resource locator prefix of the first uniform resource locator item, wherein the second uniform resource locator prefix is separated from the first uniform resource locator prefix by a delimiter, wherein the second uniform resource locator item does not include the second uniform resource locator prefix;
   determining a third uniform resource locator prefix of the second uniform resource locator item, wherein the third uniform resource locator prefix is separated from the first uniform resource locator prefix by a delimiter, wherein the first uniform resource locator item does not include the third uniform resource locator prefix;

determining a first number of occurrences of the first uniform resource locator prefix in the plurality of flow paths;

determining a second number of occurrences of the second uniform resource locator prefix in the plurality of flow paths;

determining a third number of occurrences of the third uniform resource locator prefix in the plurality of flow paths;

defining a first node representative of the determined first uniform resource locator prefix for display based on the determined first uniform resource locator prefix, wherein the first uniform resource locator item and the second uniform resource locator item of the flow path are associated with the defined first node;

defining a second node representative of the determined second uniform resource locator prefix for display based on the determined second uniform resource locator prefix, wherein the first uniform resource locator item and the defined first node are associated with the defined second node;

defining a third node representative of the determined third uniform resource locator prefix for display based on the determined third uniform resource locator prefix, wherein the second uniform resource locator item and the defined first node are associated with the defined third node; and generating display data comprising a representation of the defined first node, a representation of the defined second node, a representation of the defined third node, and a path connecting the defined first node and the defined second node indicative of a number of occurrences common to the defined first node and the defined second node based, at least in part, on the determined first number of occurrences and the determined second number of occurrences.

8. The system of claim 7, wherein the defined second node further comprises a third universal resource locator item including common gateway interface parameters.

9. The system of claim 7, wherein the defined first node is automatically defined.

10. The system of claim 7, wherein the defined first node is defined by a user.

11. The system of claim 7, wherein generating display data comprising the representation of the defined first node is based on entropy criterion.

12. The system of claim 7, wherein generating display data comprising the representation of the defined second node includes merging a fourth node with the defined second node based on an entropy of the fourth node exceeding a threshold.

13. A computer program product tangibly stored on a non-transitory storage medium, operable to cause one or more processors to perform operations to generate display data for a plurality of flow paths representing web page visits by a plurality of users, comprising:

receiving a first uniform resource locator item;

receiving a plurality of flow paths from a database, each flow path representing a path of web page visits by a user, a flow path of the plurality of flow paths comprising the first uniform resource locator item and a second uniform resource locator item;

determining a first uniform resource locator prefix of the first uniform resource locator item and the second uniform resource locator item of the flow path of the plurality of flow paths based on a first portion of the first uniform resource locator item matching a first portion of the second uniform resource locator item of the flow path;

determining a second uniform resource locator prefix of the first uniform resource locator item, wherein the second uniform resource locator prefix is separated from the first uniform resource locator prefix by a delimiter, wherein the second uniform resource locator item does not include the second uniform resource locator prefix;

determining a third uniform resource locator prefix of the second uniform resource locator item, wherein the third uniform resource locator prefix is separated from the first uniform resource locator prefix by a delimiter, wherein the first uniform resource locator item does not include the third uniform resource locator prefix;

determining a first number of occurrences of the first uniform resource locator prefix in the plurality of flow paths;

determining a second number of occurrences of the second uniform resource locator prefix in the plurality of flow paths;

determining a third number of occurrences of the third uniform resource locator prefix in the plurality of flow paths;

defining a first node representative of the determined first uniform resource locator prefix for display based on the determined first uniform resource locator prefix, wherein the first uniform resource locator item and the second uniform resource locator item of the flow path are associated with the defined first node;

defining a second node representative of the determined second uniform resource locator prefix for display based on the determined second uniform resource locator prefix, wherein the first uniform resource locator item and the defined first node are associated with the defined second node;

defining a third node representative of the determined third uniform resource locator prefix for display based on the determined third uniform resource locator prefix, wherein the second uniform resource locator item and the defined first node are associated with the defined third node; and generating display data comprising a representation of the defined first node, a representation of the defined second node, a representation of the defined third node, and a path connecting the defined first node and the defined second node indicative of a number of occurrences common to the defined first node and the defined second node based, at least in part, on the determined first number of occurrences and the determined second number of occurrences.

14. The product of claim 13, wherein the defined second node further comprises a third universal resource locator item including common gateway interface parameters.

15. The product of claim 13, wherein the defined first node is automatically defined.

16. The product of claim 13, wherein the defined first node is defined by a user.

17. The product of claim 13, wherein generating display data comprising the representation of the defined first node is based on entropy criterion.

18. The product of claim 13 further comprising:

assigning a first weight to the defined first node and a second weight to the defined second node, wherein the assigned first weight is based, at least in part, on the first number of occurrences, wherein the assigned second weight is based, at least in part, on the second number of occurrences.

19. The product of claim 13, wherein generating display data comprising the representation of the defined second node includes merging a fourth node with the defined second node based on an entropy of the fourth node exceeding a threshold.

\* \* \* \* \*